United States Patent
Räsänen

(10) Patent No.: US 9,084,233 B2
(45) Date of Patent: Jul. 14, 2015

(54) MOBILE NETWORK HAVING IP MULTIMEDIA SUBSYSTEM (IMS) ENTITIES AND SOLUTIONS FOR PROVIDING SIMPLIFICATION OF OPERATIONS AND COMPATIBILITY BETWEEN DIFFERENT IMS ENTITIES

(75) Inventor: Juha A. Räsänen, Espoo (FI)

(73) Assignee: Nokia Corporation, Espoo (FI)

( * ) Notice: Subject to any disclaimer, the term of this patent is extended or adjusted under 35 U.S.C. 154(b) by 2200 days.

(21) Appl. No.: 11/156,479

(22) Filed: Jun. 21, 2005

(65) Prior Publication Data
US 2005/0238002 A1    Oct. 27, 2005

Related U.S. Application Data

(63) Continuation of application No. 10/767,072, filed on Jan. 30, 2004, now abandoned.

(60) Provisional application No. 60/445,807, filed on Feb. 10, 2003.

(51) Int. Cl.
*G06F 7/04* (2006.01)
*G06F 17/00* (2006.01)
(Continued)

(52) U.S. Cl.
CPC ......... *H04W 76/022* (2013.01); *H04L 65/1006* (2013.01); *H04L 65/1016* (2013.01); *H04L 65/1073* (2013.01); *H04L 65/80* (2013.01); *H04W 12/06* (2013.01); *H04W 80/10* (2013.01)

(58) Field of Classification Search
CPC ... H04W 76/022; H04W 12/06; H04W 80/10; H04L 65/1016; H04L 65/1006; H04L 65/1073; H04L 65/80

USPC ............ 726/12, 4, 13; 713/166, 168; 709/225
See application file for complete search history.

(56) References Cited

U.S. PATENT DOCUMENTS 6,170,012 B1 * 1/2001 Coss et al. .................... 709/229
6,446,127 B1    9/2002 Schuster et al.
(Continued)

FOREIGN PATENT DOCUMENTS

WO    WO-03/003690 A1    1/2003

OTHER PUBLICATIONS

Celan, Ida, et al., "*Extensions of Sessions Initiation Protocol for Next Generation Services*", IEEE, Jun. 2003, pp. 658-688.
(Continued)

*Primary Examiner* — Aravind Moorthy
(74) *Attorney, Agent, or Firm* — Mintz Levin Cohn Ferris Glovsky and Popeo, P.C.

(57) ABSTRACT

An IP Multimedia Subsystem (IMS) architecture for IP multimedia services is provided with a given user equipment (UE); a gateway support node (GGSN) configured to handle packet transmission to/from the given UE; and a proxy call session control function (P-CSCF) configured to serve as a first contact point of the UE and provide session management services, including establishing a packet data protocol (PDP) context for IMS related signaling, registration, and other procedures for IMS sessions. The P-CSCF is also configured to perform the following: storing identification information from the given UE during registration in memory; receiving a SIP (Session Initiation Protocol) message from the given UE; comparing identity in the SIP message with the identification information stored with a link to a Policy Decision Function (PDF); and using the same PDF for all operations of the given UE, when the identity in the SIP messages matches the identification information stored in memory.

14 Claims, 6 Drawing Sheets

UE: USER EQUIPMENT
MT: MOBILE TERMINATION
TE: TERMINAL EQUIPMENT
TAF: TERMINAL ADAPTION FUNCTION

(51) Int. Cl.
| | |
|---|---|
| *H04L 29/06* | (2006.01) |
| *H04L 9/32* | (2006.01) |
| *G06F 15/173* | (2006.01) |
| *H04W 76/02* | (2009.01) |
| *H04W 12/06* | (2009.01) |
| *H04W 80/10* | (2009.01) |

(56) References Cited

U.S. PATENT DOCUMENTS

| | | | |
|---|---|---|---|
| 6,604,142 | B1 | 8/2003 | Bertrand et al. |
| 6,662,017 | B2 | 12/2003 | McCann et al. |
| 6,678,735 | B1 | 1/2004 | Orton et al. |
| 6,681,252 | B1 | 1/2004 | Schuster et al. |
| 6,694,145 | B2 | 2/2004 | Riikonen et al. |
| 6,714,515 | B1* | 3/2004 | Marchand ............ 370/231 |
| 6,718,021 | B2 | 4/2004 | Crockett et al. |
| 6,721,565 | B1 | 4/2004 | Ejzak et al. |
| 6,735,621 | B1 | 5/2004 | Yoakum et al. |
| 6,741,695 | B1 | 5/2004 | McConnell et al. |
| 6,788,676 | B2 | 9/2004 | Partanen et al. |
| 7,447,755 | B1* | 11/2008 | Maxted et al. ......... 709/223 |
| 2002/0184510 | A1* | 12/2002 | Shieh ............... 713/185 |
| 2003/0005034 | A1* | 1/2003 | Amin ................ 709/202 |
| 2003/0023880 | A1 | 1/2003 | Edwards et al. |
| 2004/0047339 | A1* | 3/2004 | Wang et al. ........... 370/352 |

OTHER PUBLICATIONS

Lee et al., "*Mobility Management Based on the Integration of Mobile IP and Session Initiation*" Protocol in Next Generation Mobile Data Networks IEEE, Oct. 2003, pp. 2058-2062.

Winder, Davey, "*Computing on the Move*", Microscope, Nov. 2004, pp. 33,34, and 36.

3GPP US 23.207 V5.6.0 (Dec. 2002), Technical Specification "3rd Generation Partnership Project; Technical Specification Group Services and System Aspects; End-to-end Quality of Service (QoS) concept and architecture"; (Release 5).

3GPP TS 29.207 V5.2.0 (Dec. 2002), Technical Specification, "3rd Generation Partnership Project; Technical Specification Group Core Network; Policy control over Go interface", (Release 5).

3GPP TS 29.208 V5.2.0 (Dec. 2002), Technical Specification, "3rd Generation partnership Project; Technical Specification Group Cores Network; End to end Quality of Service (Qos) signaling flows" (Release 5).

Hui, Joseph, Predictive Queueing Multiple Access—A Wireless ATM Protocol for Multimedia Communication, 1997, IEEE, pp. 107-111.

Varshney, Upkar, Design and Performance Evaluation of RAC/EAC for Wireless ATM Environment, 1997, IEEE, pp. 1565-1569.

Iso et al., Ubiquitous Discovery Service Platform for Mobile Applications Via a Cell Phone, 2003, IEEE pp. 5-8.

Kanter, Theo, Going Wireless, Enabling an Adaptive and Extensible Environment, 2003, Mobile Networks and Applications, pp. 37-50.

Hong Cai, et al., "Session Initiation Protocol and Web Services for Next Generation Multimedia Applications", 2002, pp. 70-80.

Ida Celam, et al., "Extensions of Session Initiation Protocol for Next Generation Services", Jun. 2003, pp. 658-688.

Hyejeong Lee, et al., "Mobility Management Based on the Integration of Mobile IP and Session Initiation Protocol in Next Generation Mobile Data Networks", Oct. 2003, pp. 2058-2062.

Davey Winder, "Computing on the Move", Nov. 2004, pp. 33, 34, and 36.

3GPP TS 29.207 version 5.2.0 Release 5, Digital cellular telecommunications system (Phase 2+); Universal Mobile Telecommunications System (UMTS); Policy control over Go interface; ETSI TS 129 207, Dec. 1, 2002.

L.N. Hamer et al., "Framework for session set-up with media authorization", IETF Standard Working Draft, Internet Engineering Task Force, IETF, Feb. 1, 2002.

3GPP TS 29.208 version 5.2.0 Release 5, Digital cellular telecommunicatiosn system (Phase 2+); Universal Mobile Telecommunications System (UMTS); End to end Quality of Service (QoS) signalling flows; ETSI TS 129 208, Dec. 1, 2002.

3GPP TR 23.917 V0.4.1, "3rd Generation Partnership Project; Technical Specification Group Services and System Aspects; Dynamic Policy control enhancements for end-to-end QoS; Release 6", Dec. 1, 2002.

3GPP TS 23.207 version 5.6.0 Release 5, Digital cellular telecommunications system (Phase 2+); Universal Mobile Telecommunications System (UMTS); End-to-end Quality of Service (QoS) concept and architecture; ETSI TS 123 207, Dec. 1, 2002.

3GPP Technical Specification (TS) 23.002, V5.9.0 (Dec. 2002) "Network Architecture".

3GPP TS 23.110, V4.0.0 (Apr. 2001) "UMTS Access Stratum: Services and Functions".

3GPP Technical Specification (TS) 21.900 V5.0.1 (Sep. 2002) "Technical Specification Group Working Methods".

3GPP TS 24.002, V5.0.0 (Dec. 2001), Release 5.

3GPP TS 24.228 V.5.3.0 (Dec. 2002) "Signalling Flows for the Ip Multimedia Call Control Based on SIP and SDP", Release 5.

3GPP Technical Specification (TS) 23.228, V6.0.1 (Jan. 2003) "IP Multimedia Subsystem (IMS)".

3GPP TS 23.101, V4.0.0 (Apr. 2002) "General UMTS Architecture".

* cited by examiner

MOBILE NETWORK HAVING IP MULTIMEDIA SUBSYSTEM (IMS) ENTITIES AND SOLUTIONS FOR PROVIDING SIMPLIFICATION OF OPERATIONS AND COMPATIBILITY BETWEEN DIFFERENT IMS ENTITIES

This application, which makes reference to, incorporates the same herein, and claims all benefits accruing under 35 U.S.C. §119(e) and §120, is a continuation application of U.S. application Ser. No. 10/767,072, filed Jan. 30, 2004 now abandoned, which, un turn, claims benefit of from a provisional application earlier filed in the United States Patent & Trademark Office (USPTO) under 37 C.F.R. §1.53(c) on Feb. 10, 2003 and assigned Ser. No. 60/445,807.

BACKGROUND OF THE INVENTION

1. Technical Field

The present invention relates to mobile networks including different IP Multimedia Subsystem (IMS) entities, and more particularly, relates to solutions for providing simplification of required policy control operations and compatibility between IMS entities based on different release specifications within mobile networks.

2. Related Art

Modern mobile networks such as those networks standardized by 3GPP ($3^{rd}$ Generation Partnership Project) specifications including all GSM (Global System for Mobile Communications) and $3^{rd}$ generations of GSM networks, are seamless integration of digital cellular networks and personal communications systems to provide telecommunication services including, for example, mobile data network services and IP multimedia services.

Each 3GPP system may include a core network and a radio access network infrastructure using General Packet Radio Service (GPRS) and Enhanced Data Rates for Global Evolution (EDGE) technologies or supporting Universal Terrestrial Radio Access (UTRA) operable in both Frequency Division Duplex (FDD) and Time Division Duplex (TDD). The core network (CN) may be logically divided into circuit switched (CS) and packet switched (PS) domains with CN entities provided for user traffic and related signaling, and an IP Multimedia Subsystem (IMS) with CN entities provided for IP multimedia services. Some CN entities such as Home Subscriber Server (HSS), Home Location Register (HLR), Authentication Center (AuC), Visitor Location Register (VLR), and Equipment Identify Register (EIR) may be common to the PS and CS domains, while other CN entities such as Mobile Switching Center (MSC) and Gateway MSC are specific to the CS domain to handle circuit switched services to/from mobile stations, and Gateway GPRS (general packet radio service) Support Node (GGSN) and Serving GSN (SGSN) are specific to the PS domain to handle the packet transmission to/from the mobile stations.

For IP multimedia services, functional IMS entities, such as Call Session Control Function (CSCF), are provided to handle CSCF related procedures, including establishing PDP (Packet Data Protocol, e.g., IP) context for IMS related signaling, registration and other procedures for IMS sessions. CSCF can act as Proxy CSCF (P-CSCF) to serve as a first contact point for a user equipment (UE) (i.e., device allowing a user to access to network services, such as, a mobile station) within the IP multimedia subsystem (IMS), Serving CSCF (S-CSCF) to handle session states in the network, or an Interrogating CSCF (I-CSCF) to serve as a contact point within an operator's network for all IMS connections destined to either a subscriber of that network operator or a roaming subscriber in a given service area. See, 3GPP Technical Specification (TS) 23.002, V5.9.0 (December 2002) "Network Architecture"; 3GPP TS 23.101, V4.0.0 (April 2002) "General UMTS Architecture"; and 3GPP TS 23.110, V4.0.0 (April 2001) "UMTS Access Stratum: Services and Functions"; and 3GPP Technical Specification (TS) 23.228, V6.0.1 (January 2003) "IP Multimedia Subsystem (IMS)". All 3GPP (GSM/3G) specifications can be found and downloaded from the 3GPP server under ftp://ftp.3gpp.org/specs, and are hereby incorporated by reference herein. In addition, mechanisms for creating, maintaining and updating 3GPP specifications (including different Releases of a given 3GPP specification with new or changed functionality) can also be found in 3GPP Technical Specification (TS) 21.900 V5.0.1 (September 2002) "Technical Specification Group Working Methods."

However, challenges remain when providing equipment interoperability and compatibility between various functional entities in a given 3GPP specification, each time new functionality or new feature is introduced and/or existing functionality is modified and, hence, a new Release of a given specification is introduced.

For example, a Policy Decision Function (PDF) has been standardized as part of the Proxy CSFC (P-CSFC) to supervise an IMS session, make policy decisions based on the IMS session and media related information, and then exchange decision information with the GGSN via a Go interface, as set forth in the 3GPP TS 29.207 V.5.2.0 (December 2002) "Policy Control over Go Interface", Release 5. The PDF is used to generate a set of binding information to bind the IMS level and the GPRS bearer level of an IMS session, and send the binding information to the GGSN, via the user equipment (UE). The GGSN then searches PDF address from the set of binding information received from the UE, identifies the correct PDF and verifies that the PDP context operations requested by the UE comply with the preceding negotiation on the IMS level; see also, and 3GPP TS 23.207 V.5.6.0 (December 2002) "End-To-End Quality of Service (QoS) Concept and Architecture", Release 5; and 3GPP TS 29.208 V.5.2.0 (December 2002) "End-To-End Quality of Service (QoS) signaling flows", Release 5.

According to the 3GPP Specification, Release 5 (December 2002), PDF is integrated into P-CSCF and only one IMS session is allowed for each PDF context. However, the 3GPP Specification, Release 6 (January 2003) is currently being planned so that PDF can be implemented in a separate network element that is separate from the P-CSCF. In addition, there may be several PDFs arranged in the core network (CN). As a result, even if P-CSCF is known, PDF may not be assumed by the core network (CN). A single P-CSCF may be configured to use the services of several PDFs, since several PDFs may exist in the core network (CN). Moreover, several IMS sessions are allowed for a single PDP (Packet Data Protocol, e.g., IP) context as currently being planned in the 3GPP Specification, Release 6 (January 2003). As a result, the UE may send/receive several session setup or modification requests (SIP INVITE) and can set up (or modify) one PDP context for several IMS sessions. If there are more than one PDFs in the core network (CN), the P-CSCF may send the authorization requests of different sessions to different PDFs.

However, if the GGSN is based on the 3GPP Specification, Release 5, the GGSN will only search one PDF address from the sets of binding information received from the UE, and send all sets of binding information to the same PDF. Some sets of binding information may be sent to wrong PDFs, which leads to reject decisions. Moreover, even if only a single-session per PDP (Packet Data Protocol, e.g., IP) context is used, a PDP context modification may be directed by the P-CSCF to a different PDF than that used at the activation of the PDP (Packet Data Protocol, e.g., IP) context. As a result, the GGSN may reject the PDP context modification request when noticing that the PDF address in the request received from the UE differs from the PDF address in the stored set of binding information. Furthermore, when several IMS sessions use the same PDP (Packet Data Protocol, e.g., IP) context, the GGSN cannot handle a modification request for some but not all IMS sessions within a single PDP (Packet Data Protocol, e.g., IP) context.

In general, if one or more functional entities such as the UE and PDF are based on the 3GPP Specification, Release 6, and another set of functional entities such as the GGSN, are based on the 3GPP Specification, Release 5, network equipments may not operate successfully. There is no way to ensure backward compatibility, when multiple IMS sessions are executed over one PDP (Packet Data Protocol, e.g., IP) context and there are functional entities in the network that are based on both the 3GPP Specification, Release 5, and the 3GPP Specification, Release 6.

Moreover, even if the functional entities are based on the same specification release, complicated operations are required at the GGSN and at the PDF to control the PDP context modifications initiated by multiple sessions and to manage the interoperation between the common PDP context and the different sessions policy controlled by separate PDFs.

Accordingly, there is a need for providing compatibility between IMS functional entities based on different Specification Releases. In addition, there is also a need for providing simplification of GGSN and PDF operations.

SUMMARY OF THE INVENTION

Various aspects of the present invention are directed to solutions for simplifying operations at IP Multimedia subsystem (IMS) entities in a mobile network and for providing compatibility between IP Multimedia subsystem (IMS) entities in a mobile network based on different Releases of a given 3GPP specification.

In accordance with one aspect of the present invention, an IP Multimedia Subsystem (IMS) architecture for IP multimedia services comprises a given user equipment (UE); a gateway support node (GGSN) configured to handle packet transmission to/from the given UE; and a proxy call session control function (P-CSCF) configured to serve as a first contact point of the UE and provide session management services, including establishing a packet data protocol (PDP) context for IMS related signaling, registration, and other procedures for IMS sessions. The P-CSCF is further configured to perform the following: storing identification information from the given UE during registration in memory; receiving a SIP (Session Initiation Protocol) message from the given UE; comparing identity in the SIP message with the identification information stored with a link to a Policy Decision Function (PDF); and using the same PDF for all operations of the given UE, when the identity in the SIP messages matches the identification information stored in memory.

In accordance with another aspect of the present invention, a Policy Decision Function (PDF) is configured to determine if one or more IP Multimedia subsystem (IMS) sessions in a PDP (Packet Data Protocol) context are modified, and when one or more IMS sessions in a PDP context are modified, send an aggregate authorization decision including both modified sessions and non-modified sessions per PDP context for policy enforcement In accordance with yet another aspect of the present invention, a computer readable medium is provided which comprises instructions that, when executed by a mobile network, perform Proxy Call State Control Function (P-CSCF) in a mobile network, including: storing identification information from a given user equipment (UE) at registration in memory; receiving a SIP (Signal Initiated Protocol) message from the given UE; comparing identity in the SIP message with the identification information stored with a link to a Policy Decision Function (PDF); and using the same PDF for all operations of the given UE, when the identity in the SIP messages matches the identification information stored in memory.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAIL DESCRIPTION OF EMBODIMENTS OF THE INVENTION

The present invention is applicable for use with all types of mobile networks including $2^{nd}$ and $3^{rd}$ generations of GSM (Global System for Mobile Communications) networks, transit networks such as Internet, Intranets, local area networks (LANs) and ATM based transit networks, and terminating networks such as public switched telephone networks (PSTNs), ISDNs, IP networks/LANs, X.25 and Public Land Mobile Networks (PLMNs) and interconnected systems and related protocols used for voice, message, data and image transfers between systems in such mobile networks. For example, $3^{rd}$ generation GSM networks including data networks using General Packet Radio Service (GPRS) technology for mobile data networking services and IP multimedia services, and Enhanced Data Rates for Global Evolution (EDGE) technology for high bit rate data services. GPRS technology is used in GSM networks to enable users to connect at higher data rates and make applications such as wireless email and Web-browsing easier and more useful. EDGE is used to further boost the data speeds and allow video and mobile multimedia applications with data rates as high as 473 kbps. However, for the sake of simplicity, discussions will concentrate mainly on the PLMN including IP Multimedia Subsystem (IMS) entities for providing IP multimedia services.

Figure 1:
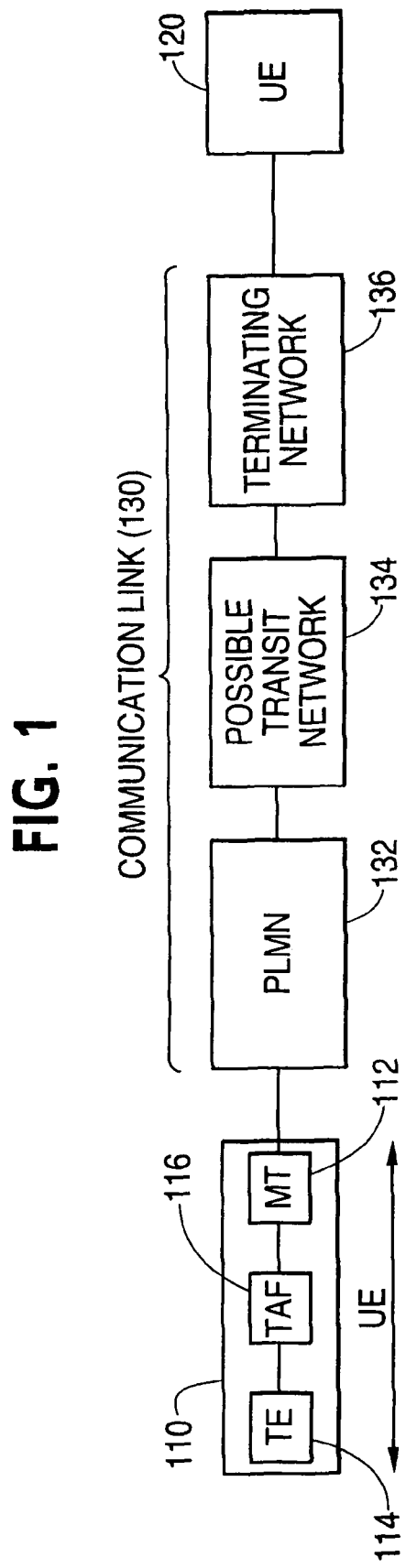
FIG. 1 illustrates an example network system architecture for providing telecommunication services including IP multimedia services according to the 3GPP Specification, Release 5.

Attention now is directed to the drawings and particularly to FIG. 1, an example network system architecture for providing telecommunication services including IP multimedia services according to the 3GPP Specification, Release 5, is illustrated. As shown in FIG. 1, the network system architecture 100 may broadly include, for example, an originating user equipment (UE) 110, a terminating user equipment (UE) 120 or vice versa, and a communication link 130 arranged to connect the user equipments (UEs) 110/120 and may span over a single network or different networks such as, for example, a Public Land Mobile Network (PLMN) 132, one or more transit networks 134 and a terminating network 136. The user equipment (UE) 110/120 may be any device or user terminal to allow a user to access to network services, including, for example, a remote server or a mobile station (MS) for GSM as defined in 3GPP TS 24.002, V5.0.0 (December 2001), Release 5.

Each UE 110/120 may include, for example, a mobile termination (MT) 112, a terminal equipment (TE) 114, and a terminal adaptation function (TAF) 116 arranged to perform radio transmission and related functions, and may contain end-to-end applications to support telecommunication services.

The transit network 134 may include, but not limited to, Internet, Intranet, a local area network (LAN) or an ATM based transit network. The terminating network 136 may include, but not limited to, a public switched telephone network (PSTN), an ISDN, an IP network/LAN, X.25 or another Public Land Mobile Network (PLMN).

Figure 2:
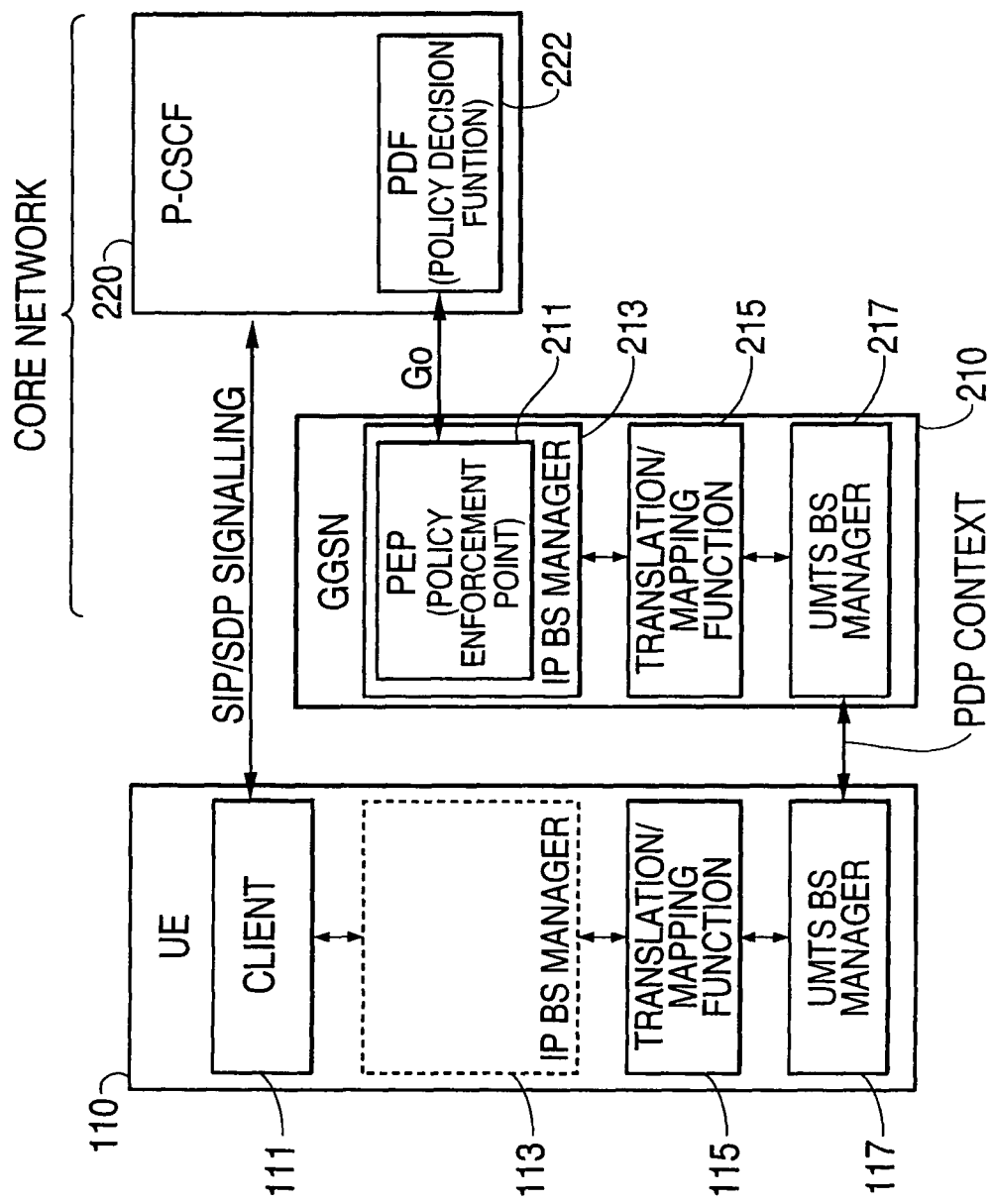
FIG. 2 illustrates an example interface architecture of IMS functional entities according to the 3GPP Specification, Release 5.

FIG. 2 illustrates an example interface architecture of IMS functional entities in mobile networks according to the 3GPP Specification, Release 5. As shown in FIG. 2, the Gateway GPRS (general packet radio service) Support Node (GGSN) 210 and the Proxy Call Session Control Function (P-CSCF) 220 represent network entities (e.g., stand-alone network hardware) that are part of the core network (CN), for example, the PLMN 132 as shown in FIG. 1. GGSN 210 may be used to handle the packet transmission to/from the UE 110/120 (e.g., mobile stations). P-CSFC 220 may be used to serve as a first contact point for a given UE 110/120 and to provide session management services and CSCF related procedures, including establishing PDP (Packet Data Protocol, e.g., IP) context for IP multimedia subsystem (IMS) related signaling, registration and other procedures for IMS sessions.

According to the 3GPP Specification, Release 5 (December 2002), a Policy Decision Function (PDF) 222 is integrated into P-CSCF 220 to supervise an IMS session when the UE 110 issues or receives a SIP (Session Initiation Protocol) message containing SDP (Session Description Protocol) signaling to negotiate parameters for an IMS session, make policy decisions based on the IMS session and media related information obtained from the P-CSCF 220, and then exchange decision information with the GGSN 210 via a Go interface, as set forth in the 3GPP TS 29.207 V.5.2.0 (December 2002) "Policy Control over Go Interface", Release 5. In addition, only a single IMS session is allowed for each PDP (Packet Data Protocol, e.g., IP) context.

As previously discussed and set forth in the 3GPP Specification, Release 5, the PDF 222 is used to generate a set of binding information (especially, an authorization token) to bind the IMS level and the GPRS bearer level of an IMS session, and send the binding information to the GGSN 210, via the user equipment (UE) 110. Binding information associates a PDP (Packet Data Protocol, e.g., IP) context with one or more media components (IP flows) of an IMS session, and is used by the GGSN 210 to request Service-based local policy (SBLP) information from the PDF 222. Such binding information typically includes:

(1) an authorization token sent by the P-CSCF 220 to the UE 110 during SIP/SDP signaling, and (2) one or more flow identifiers (which may be added by the UE 110 after receiving the binding information from the P-CSCF/PDF) used by the UE 110, GGSN 210 and PDF 222 to uniquely identify the IP media flow(s) associated with the SIP session.

Upon receipt of such binding information, the GGSN 210 is then used to search PDF address from the set of binding information (from the authorization token) received from the UE 110, identify the correct PDF and verify that the PDP context operations requested by the UE 110 comply with the preceding negotiation on the IMS level.

In the GGSN 210, the Policy Enforcement Point (PEP) 211 is a logical entity that communicates with the PDF regarding Service-based local policy (SBLP) control. For purposes of simplicity, the GGSN 210 is assumed to contain the PEP 211 implicitly unless otherwise stated. The GGSN 210 sends requests to and receives decisions from the PDF 222. The GGSN 210 may cache the policy decision data of the PDF decisions that may be used later for a local policy decision allowing the GGSN 210 to make policy control decision about the quality of service (QoS) authorization for PDP context modifications without requiring additional interaction with the PDF 222. The PEP functionalities for SBLP in the GGSN are described in, and incorporated by reference herein, the 3GPP TS 29.207 V.5.2.0 (December 2002) "Policy Control over Go Interface", Release 5 and, hence, need not be repeated herein.

Both the UE 110 and the GGSN 210 may also include mechanisms for managing IP quality of service (QoS) end-to-end functions and related signaling flows as described in, and incorporated by reference herein, the 3GPP TS 23.207 V.5.6.0 (December 2002) "End-To-End Quality of Service (QoS) Concept and Architecture", Release 5, and the 3GPP TS 29.208 V.5.2.0 (December 2002) "End-To-End Quality of Service (QoS) signaling flows", Release 5. For example, the UE 110 may include a client application 111, an IP bearer service (BS) manager 113, a translation/mapping function 115 and, optionally, a UMTS bearer service (BS) manager 117. Likewise, the GGSN 210 may also include an IP BS manager 213, a translation/mapping function 215 and, optionally, an UMTS BS manager 217. IP BS managers 113 and 213 typically use standard IP mechanisms to manage IP bearer services. The translation/mapping functions 115 and 215 provide inter-working between the mechanisms and parameters used within the UMTS bearer services and those used within the IP bearer services, and interact with the IP BS managers 113 and 213. UMTS BS managers 117 and 217 use standard UMTS mechanisms to manage UMTS (Universal Mobile Telecommunications System) bearer services and QoS management functions for UMTS bearer services.

Figure 3:
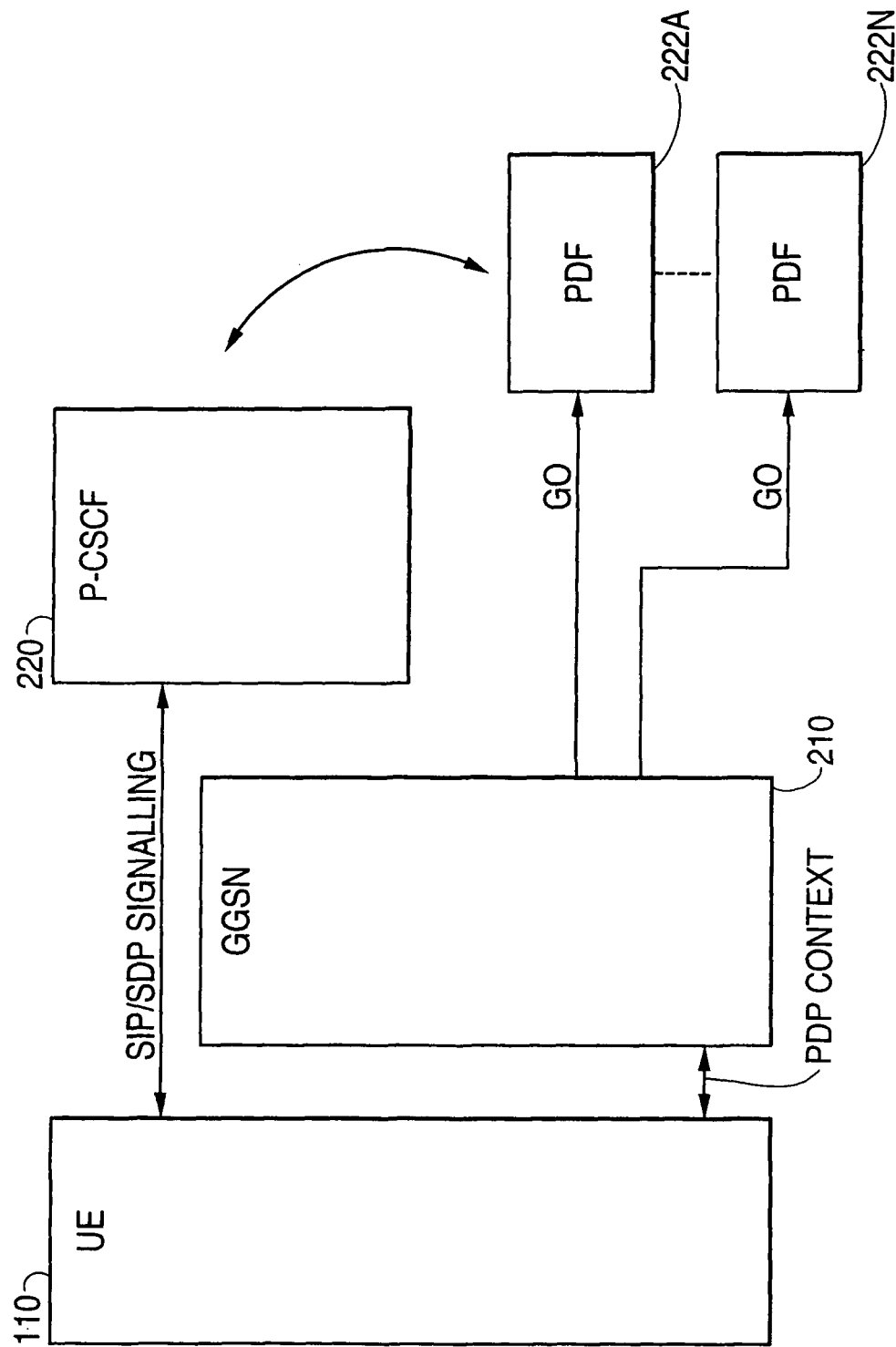
FIG. 3 illustrates an example interface architecture of IMS functional entities currently being planned for the 3GPP Specification, Release 6.

FIG. 3 illustrates an example interface architecture of IMS functional entities currently being planned for the 3GPP Specification, Release 6. According to the plans for the 3GPP Specification, Release 6 (January 2003), PDF is no longer part of the P-CSCF 220. Rather, the PDF is now implemented in a separate network element that is separate from the P-CSCF 220. In addition, there may be several PDFs 222A-222N arranged in the core network (CN). As a result, even if P-CSCF 220 is known, PDF may not be assumed by the core network (CN). A single P-CSCF 220 may be configured to use the services of several PDFs 222A-222N, since several PDFs 222A-222N may exist in the core network (CN). Moreover, several IMS sessions are allowed for a single PDP (Packet Data Protocol, e.g., IP) context since both the UE 110 and the PDF 222 are based on the plans for the 3GPP Specification, Release 6 (January 2003). As a result, the UE 110 may send/receive several session setup or modification requests (SIP INVITE) and can set up (or modify) one PDP context for several IMS sessions. If there are more than one PDFs 222A-222N in the core network (CN), the P-CSCF 220 may send the authorization requests of different sessions to different PDFs 222A-222N.

However, if the GGSN 210 is based on the 3GPP Specification, Release 5, the GGSN 210 will only search one PDF address from the sets of binding information received from the UE 110, and send all sets of binding information to the same PDF. Some sets of binding information may be sent to wrong PDFs, which leads to reject decisions. Moreover, even if only a single-session per PDP (Packet Data Protocol, e.g., IP) context is used, a PDP context modification may be directed by the P-CSCF 220 to a different PDF than that used at the activation of the PDP (Packet Data Protocol, e.g., IP) context. As a result, the GGSN 210 may reject the PDP context modification request when noticing that the PDF address in the request received from the UE 110 differs from the PDF address in the stored set of binding information. Furthermore, when several IMS sessions use the same PDP (Packet Data Protocol, e.g., IP) context, the GGSN 210 cannot handle a modification request for some but not all IMS sessions within a single PDP (Packet Data Protocol, e.g., IP) context.

Therefore, if one or more IMS functional entities such as the UE 110 and PDF 222, as shown in FIG. 3, are based on the 3GPP Specification, Release 6, and another set of functional entities such as the GGSN 210 as shown in FIG. 2, are based on the 3GPP Specification, Release 5, network equipments may not operate successfully. There is no way to ensure backward compatibility, when multiple IMS sessions are executed over one PDP (Packet Data Protocol, e.g., IP) context and there are functional entities in the network that are based on both the 3GPP Specification, Release 5, and the 3GPP Specification, Release 6.

Moreover, even if the IMS functional entities are based on the same specification release, complicated operations are required at the GGSN 210 and at the PDF 222, if sessions controlled by separate PDFs are multiplexed in the same PDP context, or if the PDP context activation and modification(s) are handled by different PDFs 222A-222N. The PDF 222 should be aware of the other sessions being multiplexed on the same PDP context and being handled by other PDFs, in order to be able to handle the session release and PDP context deactivation correctly. The GGSN 210 should be able to combine the session based authorization decision from different PDFs 222A-222N to form correct authorization information for the common PDP context. The GGSN 210 should also maintain status information of each session, i.e., should be session aware instead of being just PDP context aware.

Figure 4:
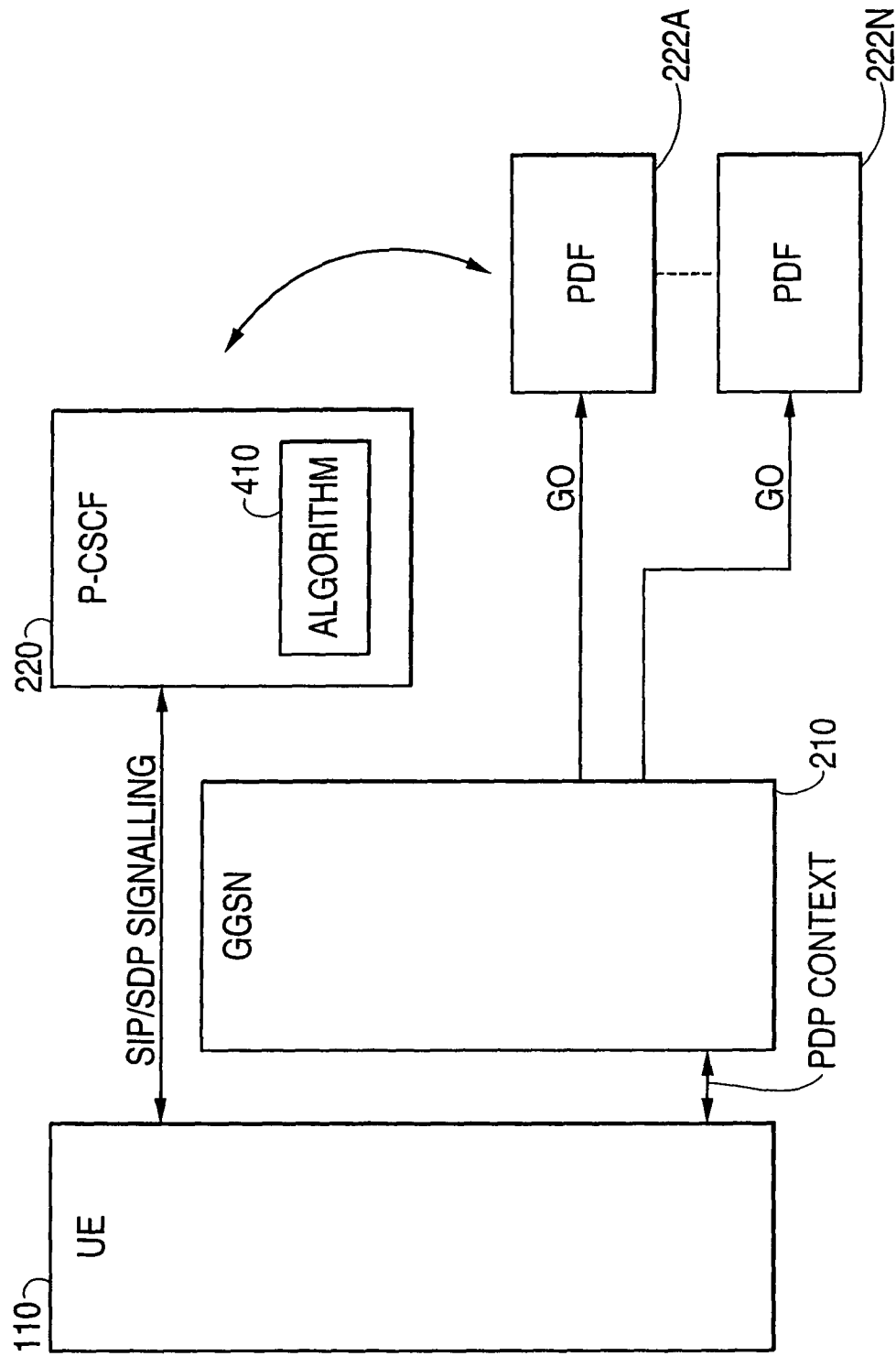
FIG. 4 illustrates an example interface architecture of IMS functional entities according to an embodiment of the present invention.

Turning now to FIG. 4, an example interface architecture of IMS functional entities according to an embodiment of the present invention is illustrated. The interface architecture as shown in FIG. 4, advantageously provides simplification of operations of IMS network entities and backward compatibility between various IMS entities in a mobile network based on different Releases of a given 3GPP specification, when multiple IMS sessions are executed over a single PDP context.

As shown in FIG. 4, an algorithm 410 may be implemented as part of the P-CSCF 220 to ensure that the P-CSCF 220 will use the same PDF for all operations of a given UE 110. This way the GGSN 210 will always obtain only one and the same PDF address for all operations. As a result, even if the GGSN 210 and other IMS entities are based on the 3GPP Specification, Release 5, the GGSN 210 will always operate in compliance with other IMS entities such as UE 110 and P-CSCF 220 based on the 3GPP Specifciation, Release 6. Moreover, the operation of the GGSN 210 and the PDF is much simpler when there is no one-to-many relationship between the IMS entities.

In order to ensure that the P-CSCF 220 uses the PDF for all operations of a given UE 110, the UE 110 is required for registration. Specifically, the UE 110 may send identification information to the S-CSCF (not shown), via the P-CSCF 220. Such identification information may correspond to an IP address of the UE 110 and may be used in subsequent requests to/from the same UE 110. The P-CSCF 220 then stores the identification information received at the registration; see 3GPP TS 24.228 V.5.3.0 (December 2002) "Signalling Flows for the IP Multimedia Call Control Based on SIP and SDP", Release 5. When receiving a SIP message leading to PDF operations, the P-CSFC 220 may check the identification information in the SIP message, and compare the identity in the SIP message to stored identification information with a link to a PDF (i.e. the stored identity information leads to a certain PDF address). Alternatively, the identification information may correspond to a pre-configured address range or URI range. Since the P-CSCF 220 knows all usable addresses of the PDFs 222A-222N, e.g. through pre-configuration, the PDF addresses may be used either dynamically (e.g. when a given UE 110 registers, a certain PDF address is allocated to the UE 110 for the duration of the registration) or statically (e.g. a certain PDF address for a certain range of UE indentities). As a result, incompatibility between the IMS functional entities such as the UE 110 and PDF 222, as shown in FIG. 3, based on the plans for the 3GPP Specification, Release 6, and another set of functional entities such as the GGSN 210 as shown in FIG. 2, based on the 3GPP Specification, Release 5, can be advantageously avoided. A further and considerable advantage of simplication of operations required in the GGSN 210 and in the PDF 222 is achieved, even if all network elements are based on the same specification release. When the same PDF is used for all sessions of a PDP context, the GGSN 210 does not have to combine authorization decisions from different PDFs to obtain the final authorization for the PDP context, and the session release vs. PDP context deactivation is much simpler for the PDF 222.

In addition, the PDF 222 may also be configured to send an aggregated authorization decision per PDP context to cover both the non-modified sessions and the modified sessions per PDP context, if only one or some of the IMS sessions in a PDP context are modified. This way the GGSN 210 does not have to handle parameters of separate IMS sessions and combine the changed and unchanged (stored) parameters to obtain the final authorized parameters for the PDP context.

Figure 5:
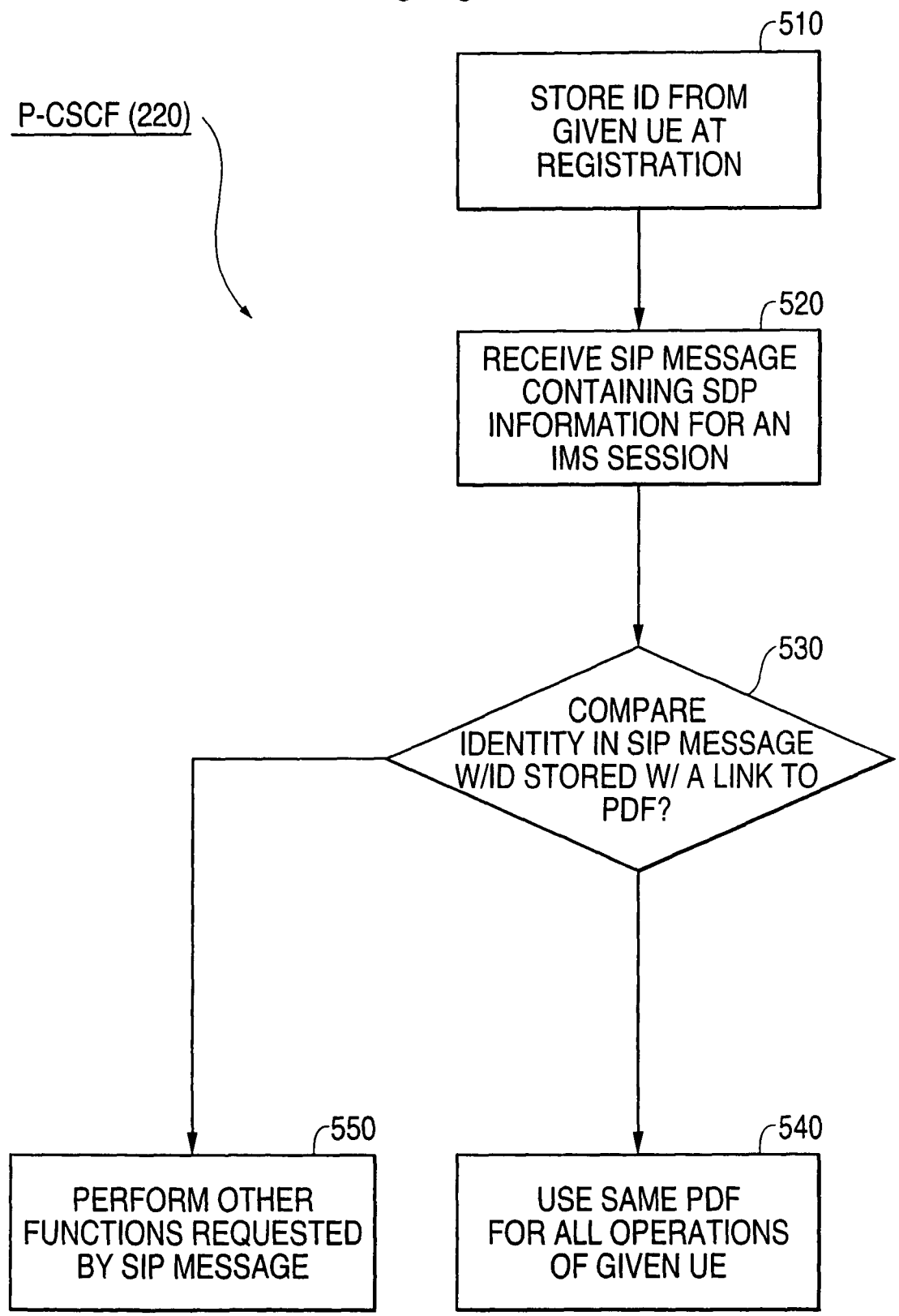
FIG. 5 illustrates an example flowchart implementation at Proxy-CSCF (P-CSCF) for providing simplification of operations at IMS entities and compatibility between IMS entities in a mobile network according to an embodiment of the present invention.

FIG. 5 illustrates an example flowchart implementation at Proxy-CSCF (P-CSCF) for providing compatibility between IMS entities or simplification of GGSN and PDF operations according to an embodiment of the present invention. As shown in FIG. 5, the P-CSCF 220 may contain an algorithm 410, shown in FIG. 4, which is activated to perform the followings:

At block 510, the P-CSCF 220 stores identification information from a given UE 110 received at the registration in memory. Subsequently, the P-CSCF 220 receives a SIP message containing SDP information for an IMS session leading to PDF operations at block 520, and then compares the identity in the SIP message with the identification information stored in memory with a link to a PDF 222 (i.e., stored identification information leads to a certain PDF address) at block 530.

If the identity in the SIP message matches with the identification information stored in memory with a link to a PDF 222, the P-CSCF 220 uses the same PDF for all operations of the given UE 110 at block 540. Alternatively, if the identity in the SIP message does not match with the identification information stored in memory with a link to a PDF 222, the P-CSCF 220 then performs other functions as requested by the SIP message at block 550.

Figure 6:
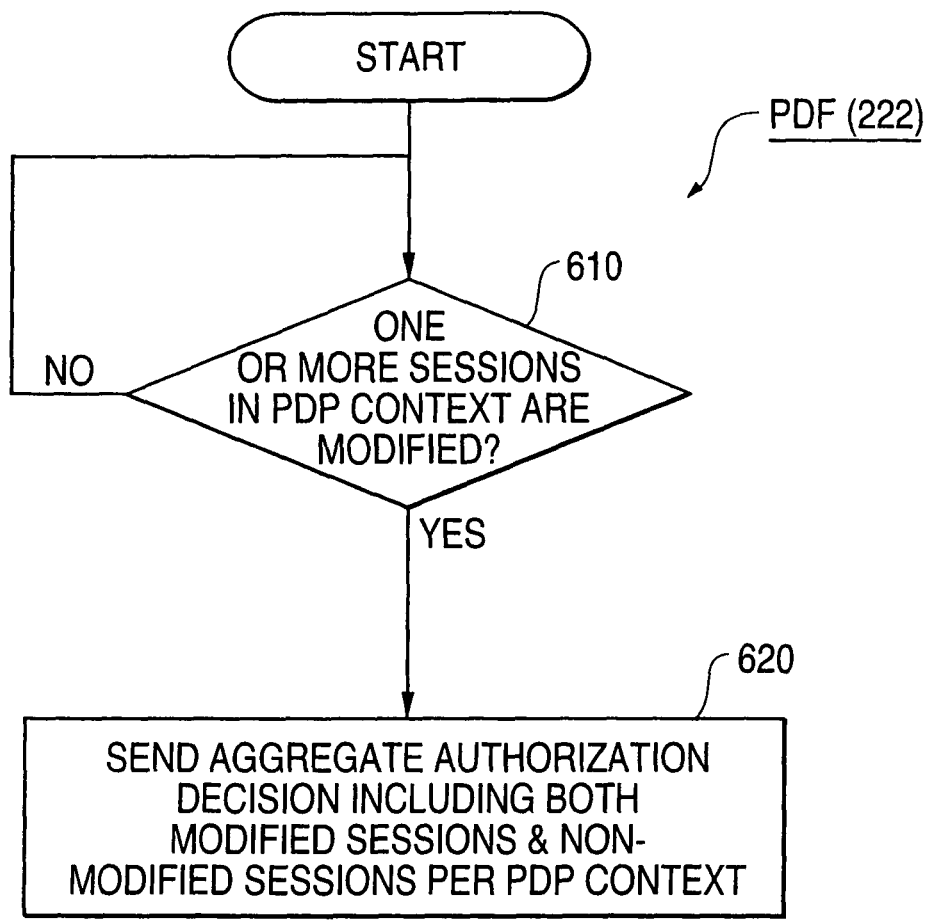
FIG. 6 illustrates an example flowchart implementation at Policy Decision Function (PDF) for providing simplification of operations at IMS entities and compatibility between IMS entities in a mobile network according to an embodiment of the present invention.

FIG. 6 illustrates an example flowchart implementation at Policy Decision Function (PDF) for providing compatibility between IMS entities or simplification of GGSN and PDF operations according to an embodiment of the present invention. The PDF 222 may support multiple IMS sessions per a PDP context as set forth in the 3GPP Specification, Release 6. As shown in FIG. 6, the PDF 222 may be configured to perform the following:

At block 610, the PDF 222 determines if one or more IMS sessions in a PDP context are modified. If one or more IMS sessions in a PDP context are modified, the PDF 222 sends an aggregated authorization decision per PDP context, covering both the non-modified sessions and the modified sessions per PDP context to the GGSN 210 for policy enforcement at block 620. This way the GGSN 210 does not have to handle parameters of separate IMS sessions and combine the changed and unchanged (stored) parameters to obtain the final authorized parameters for the PDP context.

As described from the foregoing, the network interface architecture according to an embodiment of the present invention provides compatibility between IP Multimedia subsystem (IMS) entities in a mobile network based on different Releases of a given 3GPP specification, while promoting simplification of operations at various IMS entities, such as GGSN and PDF operations.

While there have been illustrated and described what are considered to be example embodiments of the present invention, it will be understood by those skilled in the art that various changes and modifications may be made, and equivalents may be substituted for elements thereof without departing from the true scope of the present invention. Further, many modifications may be made to adapt a particular situation to the teachings of the present invention without departing from the central scope of the present invention. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus, comprising:
a receiver, at a proxy call state control function, configured to receive a session initiation protocol message with identification information from an user equipment; and
a processor, at the proxy call state control function, configured to use the identification information of the user equipment to determine one of a plurality of policy decision functions to contact,
wherein the processor is configured to use the same one of the policy decision functions for all sessions of the user equipment, wherein all of the sessions comprise at least one packet data protocol context of the user equipment.

2. The apparatus as claimed in claim 1, wherein the plurality of policy decision functions are a separate entity from that of the apparatus.

3. The apparatus as claimed in claim 1, wherein the one of the policy decision functions is configured to determine if one or more internet protocol multimedia subsystem sessions in the packet data protocol context are modified, and when one or more internet protocol multimedia subsystem sessions in the packet data protocol context are modified, send an aggregate authorization decision including both modified sessions and non-modified sessions per packet data protocol context for policy enforcement.

4. The apparatus as claimed in claim 1, wherein the identification information is obtained from the user equipment during registration, and is linked with the one of the policy decision functions.

5. A system, comprising:
an user equipment;
a gateway support node configured to handle packet transmission to/from the user equipment; and
a proxy call session control function configured to serve as a first contact point of the user equipment and provide session management services, including establishing a packet data protocol context for system related signaling, registration, and other procedures for system sessions,
wherein said proxy call session control function is further configured to:
receive a session initiation protocol message with identification information from the user equipment;
use the identification information of the user equipment to determine one of a plurality of policy decision functions to contact; and
use the same one of the policy decision functions for all sessions of the user equipment, wherein all of the sessions comprise at least one packet data protocol context of the user equipment.

6. A method, comprising:
receiving a signal initiated protocol message with identification information from an user equipment;
using the identification information of the user equipment to determine one of a plurality of policy decision functions to contact; and
using the same one of the policy decision functions for all sessions of the user equipment, wherein all of the sessions comprise at least one packet data protocol context of the user equipment.

7. The method as claimed in claim 6, wherein the plurality of policy decision functions are a separate entity from that of a proxy call session control function configured to perform the method.

8. The method as claimed in claim 6, wherein the one of the policy decision functions is configured to determine if one or more internet protocol multimedia subsystem sessions in the packet data protocol context are modified, and when one or more internet protocol multimedia subsystem sessions in the packet data protocol context are modified, send an aggregate authorization decision including both modified sessions and non-modified sessions per packet data protocol context for policy enforcement.

9. The method as claimed in claim 6, wherein the identification information is obtained from the user equipment during registration, and is linked with the policy decision function.

10. A non-transitory computer-readable storage medium encoded with instructions that, when executed on a computer, perform a process, the process comprising:
   receiving a signal initiated protocol message with identification information from an user equipment;
   using the identification information of the user equipment to determine one of a plurality of policy decision functions to contact; and
   using the same one of the policy decision functions for all sessions of the user equipment, wherein all of the sessions comprise at least one packet data protocol context of the user equipment.

11. The computer-readable storage medium as claimed in claim 10, wherein the plurality of policy decision functions are a separate entity from that of the computer-readable storage medium.

12. The computer-readable storage medium as claimed in claim 10, wherein the one of the policy decision functions is configured to determine if one or more internet protocol multimedia subsystem sessions in the packet data protocol context are modified, and when one or more internet protocol multimedia subsystem sessions in the packet data protocol context are modified, send an aggregate authorization decision including both modified sessions and non-modified sessions per packet data protocol context for policy enforcement.

13. The computer-readable storage medium as claimed in claim 10, wherein the identification information is obtained from the user equipment during registration, and is linked with the policy decision function.

14. An apparatus, comprising:
   storing means for storing identification information received from an user equipment at registration in memory;
   receiving means for receiving a session initiation protocol message with identification information from the user equipment; and
   processing means for using the identification information of the user equipment to determine one of a plurality of policy decision functions to contact,
   wherein the processing means is for using the same one of the policy decision functions for all sessions of the user equipment, wherein all of the sessions comprise at least one packet data protocol context of the user equipment.

\* \* \* \* \*